United States Patent

Ishiguro

[11] Patent Number: 5,815,750
[45] Date of Patent: Sep. 29, 1998

[54] CAMERA HAVING A FINGER DETECTING DEVICE

[75] Inventor: Minoru Ishiguro, Saitama, Japan

[73] Assignee: Fuji Photo Optical Co., Ltd., Saitama, Japan

[21] Appl. No.: 916,227

[22] Filed: Aug. 22, 1997

[30] Foreign Application Priority Data

Sep. 2, 1996 [JP] Japan .................................. 8-231822

[51] Int. Cl.$^6$ .................................................. G03B 17/38
[52] U.S. Cl. ........................................... 396/201; 396/266
[58] Field of Search .................................. 396/201, 266, 396/535

[56] References Cited

U.S. PATENT DOCUMENTS

| | | | |
|---|---|---|---|
| 5,210,560 | 5/1993 | Labaziewicz | 396/296 |
| 5,581,315 | 12/1996 | Ishiguro | 396/201 X |
| 5,619,297 | 4/1997 | Noguchi | 396/201 |
| 5,640,628 | 6/1997 | Yoshida | 396/535 X |

FOREIGN PATENT DOCUMENTS 7-306453  11/1995  Japan .

*Primary Examiner*—Howard B. Blankenship
*Attorney, Agent, or Firm*—Young & Thompson

[57] ABSTRACT

A camera has a finger detecting device for indirectly detecting that a finger rests on an electronic flash and so forth due to unsuitable holding of the camera. The finger detecting device comprises a conductive member and an auxiliary electrode. The conductive member is disposed near the electronic flash and bared to outside of the camera. The auxiliary electrode is connected to the conductive member and disposed in the camera. A detecting electrode faces the auxiliary electrode via an insulating member. The finger is detected on the basis of change of capacity applied to the detecting electrode. Sensitivity of the finger detecting device is improved by changing the size of the auxiliary electrode without enlarging the conductive member. Accordingly, although the bared portion of the conductive member is small, the finger detecting device has a detecting performance which is similar to that of conventional one.

9 Claims, 7 Drawing Sheets

CAMERA HAVING A FINGER DETECTING DEVICE

BACKGROUND OF THE INVENTION

1. Field of the Invention

The present invention relates to a camera having a finger detecting device, and more particularly to a camera in which failure of photographing due to resting the finger on a light emitting window or a light receiving window is prevented.

2. Description of the Related Art

In a compact camera provided with an electronic flash, an automatic focusing mechanism and an automatic exposure control mechanism, most errors of photographing are due to a finger resting on a flash window, a taking lens, a distance measurement window and a photometry window. In order to prevent such errors, applicant of the present application suggests a warning system in Japanese Patent Laid-open Publication No. 7-306453 which is a counterpart of U.S. patent application Ser. No. 08/381,445 (filed on Jan. 31, 1995). In the warning system, a detecting portion of a touch sensor which is capacity detecting type is provided on a camera body so that the finger resting thereon due to unsuitable holding is electrically detected to warn that.

Figure 8:
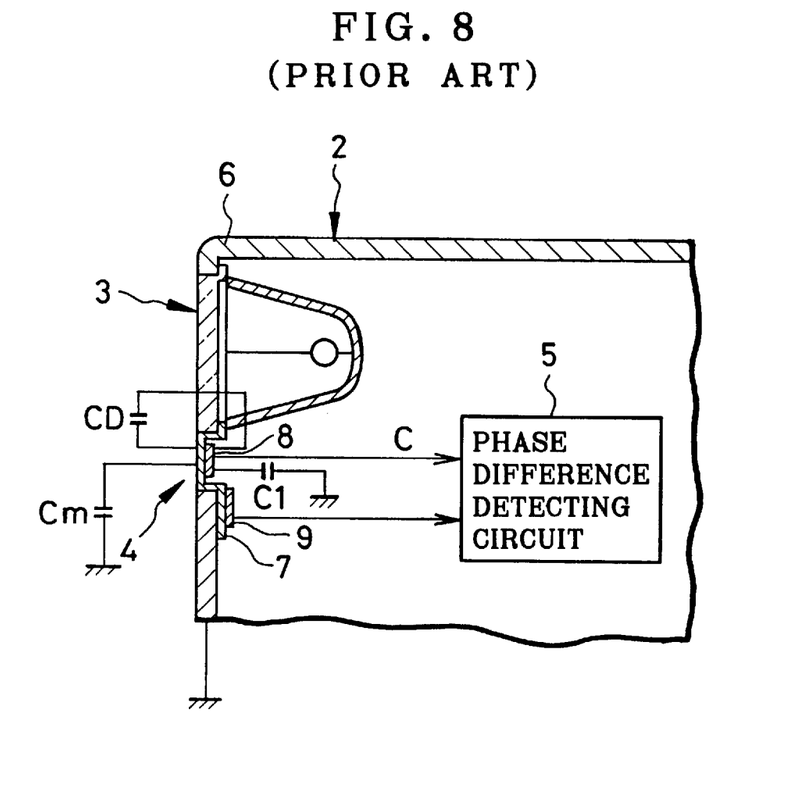
FIG. 8 is a partially sectional view of a camera using a conventional touch sensor.

As shown in FIG. 8, the touch sensor is constituted of a detecting unit 4 and a phase difference detecting circuit 5. The detecting unit 4 is disposed, for example, under an electronic flash 3 of a camera 2. The detecting circuit 5 detects a change of capacitance applied to the detecting unit 4. The detecting unit 4 comprises an insulating material 7, a detecting electrode 8 and a correction electrode 9. The insulating material 7 emerges to outside of an external plate 6 of the camera 2. The detecting electrode 8 is disposed at the back of the insulating material 7. The correction electrode 9 is disposed at an under portion apart from the detecting electrode 8 and at the back of the external plate 6, catching the insulating material 7.

Figure 9:
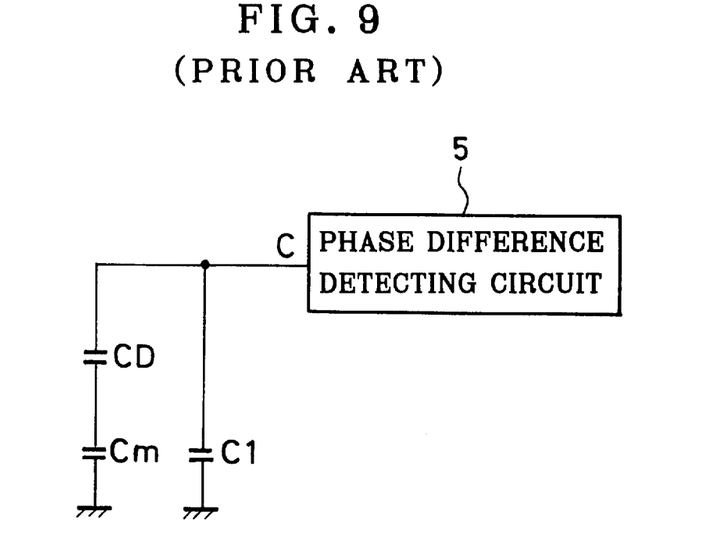
FIG. 9 is a circuit diagram showing a capacity applied to a phase difference detecting circuit from a conventional detecting unit.

Capacities generating at each portions of the detecting unit 4 are capacitance C1 of the detecting electrode 8 itself, capacitance CD between the detecting electrode 8 and a photographer, and capacitance Cm of the photographer. As shown in FIG. 9, these capacities are applied to the detecting circuit 5 as capacitance C.

When a hand of the photographer does not contact the detecting unit 4, the capacitance C1 is applied to the detecting circuit 5 as the capacitance C. When the hand rests on the detecting unit 4, besides the capacitance C1, the capacitance Cm and the capacitance CD are applied to the detecting circuit 5 as the capacitance C. The detecting circuit 5 compares a phase of a reference high-frequency pulse with a phase of a detected high-frequency pulse affected by the above capacities to detect the finger resting on the detecting unit 4.

In order to detect the finger certainly by the above-described touch sensor, it is necessary to take a sufficient contact area of the detecting unit 4 and the finger. For example, the insulating material, quality of which is different from that of the external plate 6, must be widely bared around the electronic flash 3. This is not preferable in view of design. It is possible to reduce the detecting unit in order to improve an external appearance of the camera. However, in this case, sensitivity of the detecting unit must be improved to obtain similar detect performance.

In order to improve the sensitivity of the capacity detecting type touch sensor, it is necessary to increase a difference ($\Delta$) of the capacities applied to the phase difference detecting circuit relative to detection and non-detection of the finger. By increasing the difference ($\Delta$), the touch sensor having similar performance is obtained if the detecting unit is reduced. The difference ($\Delta$) of the capacities with respect to the above touch sensor is represented as follows:

when the finger is not detected; $C=C1$ when the finger is detected; $C=C1+(Cm \cdot CD/(Cm+CD))$ $\Delta=1/(1+Cm/CD)$ From the above expression, in order to increase the difference $\Delta$, it is necessary to increase the capacitance CD which is the capacity between the detecting electrode 8 and the photographer. However, the capacitance CD depends on a contact state of the detecting unit 4 and the finger of the photographer. Accordingly, there arises a problem in that it is impossible to reduce the detecting unit 4 in the above touch sensor.

SUMMARY OF THE INVENTION

In view of the foregoing, it is a primary object of the present invention to provide a camera in which a finger resting on an unsuitable position is certainly detected by a small detecting unit.

It is a second object of the present invention to provide a camera in which sensitivity of the detecting unit may be set at will.

It is a third object of the present invention to provide a camera in which a portion of the detecting unit emerging to outside of the camera is reduced.

In order to active the above and other objects, the camera according to the present invention comprises an auxiliary electrode disposed in the camera and connected to a detecting member for detecting a finger of a photographer. The detecting member is conductive and protrudes from an external plate of the camera. Further, the detecting member is positioned near an electronic flash. Accordingly, when the finger is put near to the electronic flash, the finger touches the detecting member.

In a preferred embodiment, at the back side of the auxiliary electrode, a detecting electrode is attached via an insulating member. The detecting electrode is connected to a detecting circuit. The detecting circuit detects a change of capacity applied to the detecting electrode.

When the finger does not touch the detecting member, as the capacitance applied to the detecting circuit, there are capacitance of the detecting electrode itself, capacitance between the detecting electrode and the auxiliary electrode, and capacitance between the detecting member and the external plate of the camera. When the finger touches the detecting member, capacitance of the photographer is added besides the foregoing capacitance.

Accordingly, the capacitance applied to the detecting circuit is changed by touching the detecting member. The detecting circuit detects the change of the capacitance to detect the finger touching the detecting member. When the detecting circuit detects the finger, a warning unit is activated to give a warning to the photographer.

According to the present invention, as the auxiliary electrode connected to the detecting member is provided in the camera, the detecting member emerging to outside of the camera may be reduced. Further, by changing the size of the auxiliary electrode, the detecting sensitivity of the detecting unit may be set at will.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 2:
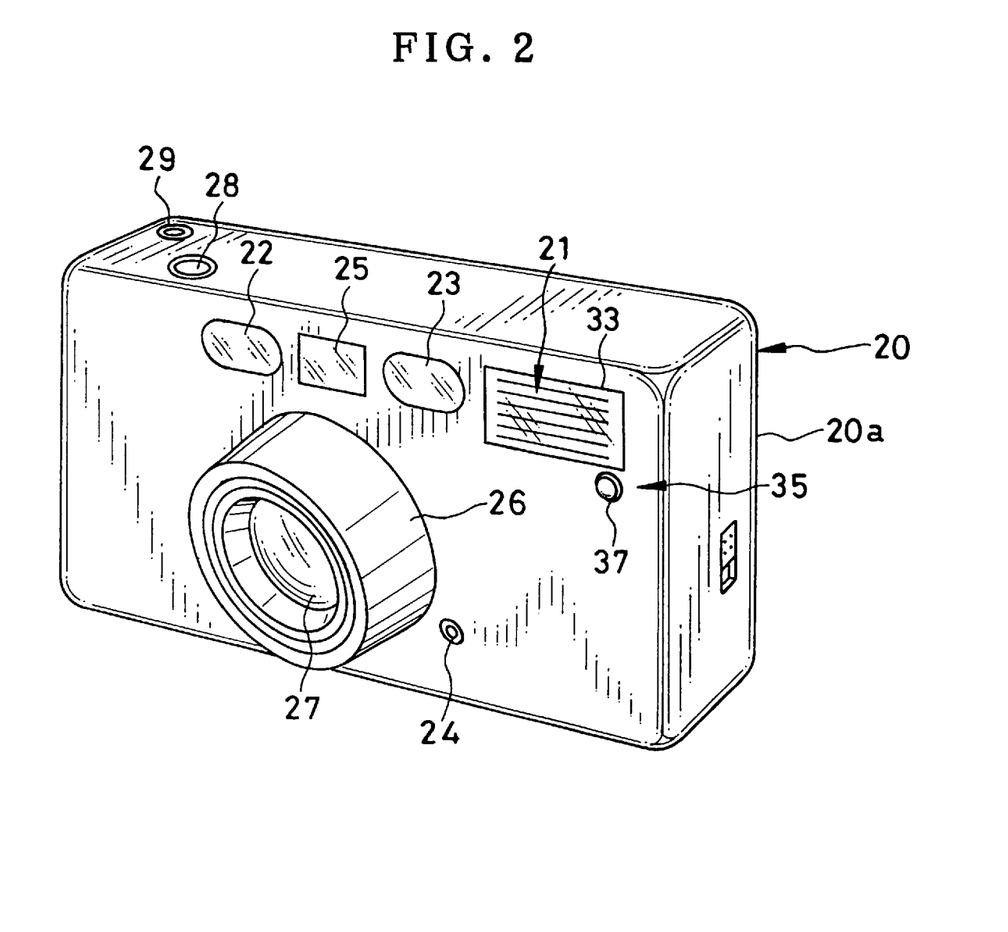
FIG. 2 is a perspective view showing an external appearance of the camera according to the present invention.

In FIG. 2 showing a camera according to the present invention, surface of the camera 20 is covered with an external plate 20a in order to give a high-grade feeling and improve durability. The external plate 20a is conductive and made of, for example, aluminum, titanium or nickel alloy. On a front face of the camera 20, there are provided an electronic flash 21 for emitting flashlight to a subject, a light emitting window 22 for automatic focusing, a light receiving window 23, a photometry window 24 for measuring subject brightness, a finder 25, a taking lens 27 held by a lens barrel 26 and so forth. On an upper face of the camera 20, a shutter release button 28 and a main switch 29 are provided. Focusing is carried out by half-push of the shutter release button 28. Shutter release is carried out by full-push of the shutter release button 28. The main switch 29 turns on and off a power supply of the camera 20.

Figure 1:
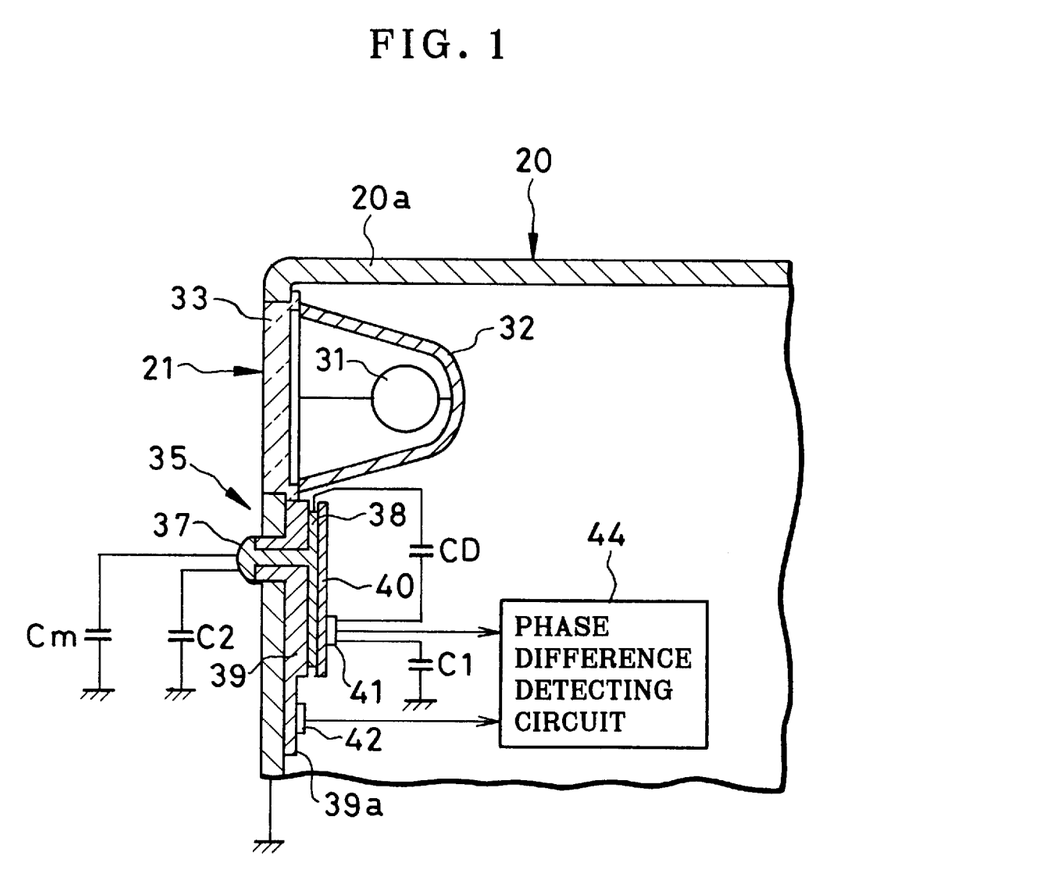
FIG. 1 is a partial cross sectional view showing a structure around a electronic flash of a camera.
Figure 3:
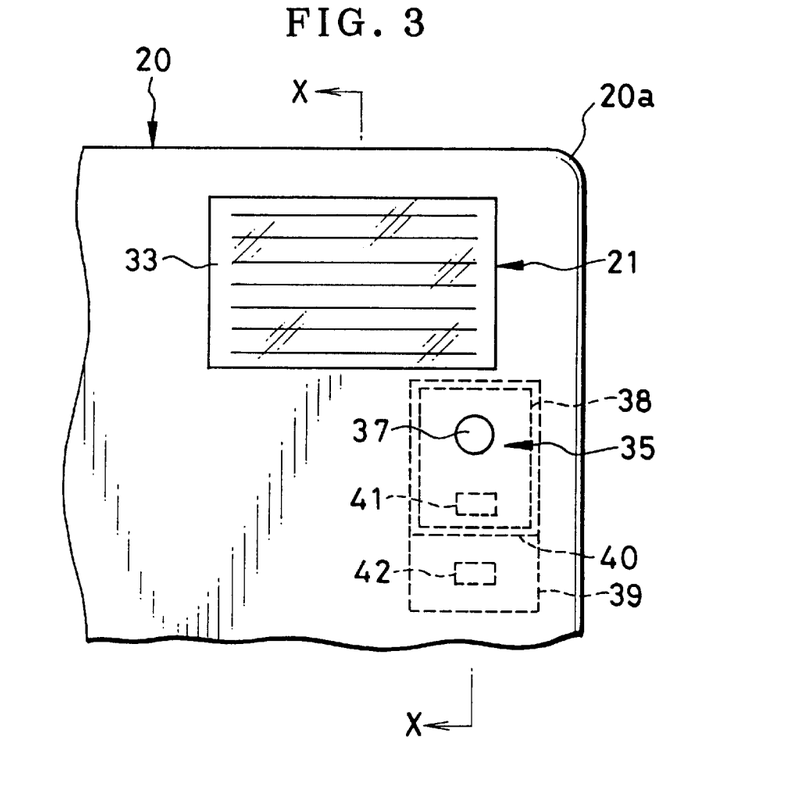
FIG. 3 is an elevational view of the electronic flash.

FIG. 3 is an elevational view of the electronic flash 21. FIG. 1 is a sectional view taken on line X—X of FIG. 3. As shown in FIGS. 1 and 3, the electronic flash 21 comprises a xenon tube 31 for emitting the flashlight, a reflector 32 for reflecting the flashlight toward the front side of the camera, and a diffusion plate 33 for protecting the xenon tube 31 and diffusing the flashlight to photographic area. The electronic flash 21 is included in an electronic flash device which is installed in the camera 20. The electronic flash device emits the flashlight automatically when the subject brightness measured with the photometry window 24 is dark.

The diffusion plate 33 is attached to a window opened in the external plate 20a and the front face thereof emerges to the outside of the camera 20. Under the diffusion plate 33, a detecting unit 35 of a touch sensor for detecting a finger overlapping on the electronic flash 21 is attached.

The detecting unit 35 comprises a conductive member 37, an auxiliary electrode 38, a first insulating member 40, a second insulating member 39 and a detecting electrode 41. The conductive member 37 slightly protrudes from the external plate 20a and emerges to outside of the camera. The auxiliary electrode 38 is connected to the conductive member 37. Incidentally, the auxiliary electrode 38 may be integrally formed with the conductive member 37. In this case, the conductive member 37 and the auxiliary electrode 38 are integrally formed by spot welding after the conductive member 37 was fitted into the second insulating member 39 and the auxiliary electrode 38 was superimposed on the conductive member 37. Further, the conductive member 37 may merely contact the auxiliary electrode 38. The second insulating member 39 insulates the conductive member 37 and the auxiliary electrode 38 from the external plate 20a. The first insulating member 40 is disposed on the back of the auxiliary electrode 38. The detecting electrode 41 faces the auxiliary electrode 38, catching the first insulating member 40. By the way, the second insulating member 39 is thinned and elongated in under direction. On a back side of a thin portion 39a thereof, a correction electrode 42 for preventing mis-detection of the finger is attached apart from the detecting electrode 41.

Figure 4:
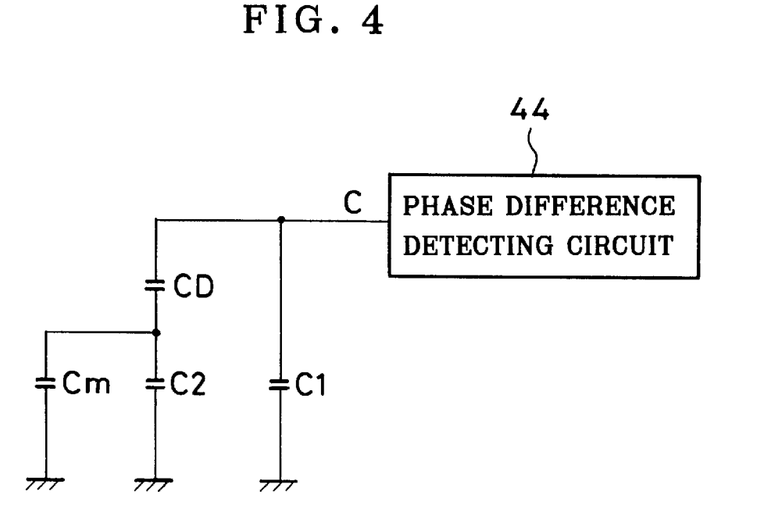
FIG. 4 is a circuit diagram showing a capacity applied to a phase difference detecting circuit.

The detecting unit 35 is connected to a phase difference detecting circuit 44 which detects the finger overlapping on the electronic flash 21 by detecting a change of capacity of the detecting unit 35. As capacitance generating at each portion of the detecting unit 35, there are capacitance C1 of the detecting electrode 41 itself, capacitance CD between the detecting electrode 41 and the auxiliary electrode 38 connected to the conductive member 37, and capacitance C2 between the conductive member 37 connected to the auxiliary electrode 38 and the external plate 20a. When the finger of the photographer touches the detecting unit 35, capacitance Cm of the photographer is added to the detecting unit 35. As shown in FIG. 4, these capacities are applied to the phase difference detecting circuit 44 as capacitance C.

When the finger does not touch the detecting unit 35, the capacitance C1, the capacitance C2 and the capacitance CD are applied to the detecting electrode 41 so that the capacitance C applied to the detecting circuit 44 is as follows:

$$C = C1 + (C2 \cdot CD/(C2 + CD))$$

When the finger rests on the detecting unit 35, the capacitance C1, C2, CD and the capacitance Cm are applied to the detecting electrode 41 so that the capacitance C applied to the detecting circuit 44 is as follows:

$$C = C1 + ((Cm + C2)CD/(Cm + C2 + CD))$$

Accordingly, difference (Δ) between the capacitance C applied to the detecting circuit 44 during the detection of the finger and the capacitance C applied to the detecting circuit 44 during the non-detection of the finger is as follows:

$$\Delta = Cm/(1 + C2/CD)(1 + (Cm + C2)/CD)$$

From the above expression, in order to improve the detecting sensitivity of the detecting unit 35, it is necessary to reduce the capacitance C2 and/or to increase the capacitance CD. As the capacitance CD is obtained from the conductive member 37 and the auxiliary electrode 38, if the conductive member 37 bared to the outside of the camera 20 is reduced, the capacitance CD may be freely changed by adjusting the size of the auxiliary electrode 38. Therefore, the detecting sensitivity may be properly set, minimizing influence for the design of the camera 20.

Figure 5:
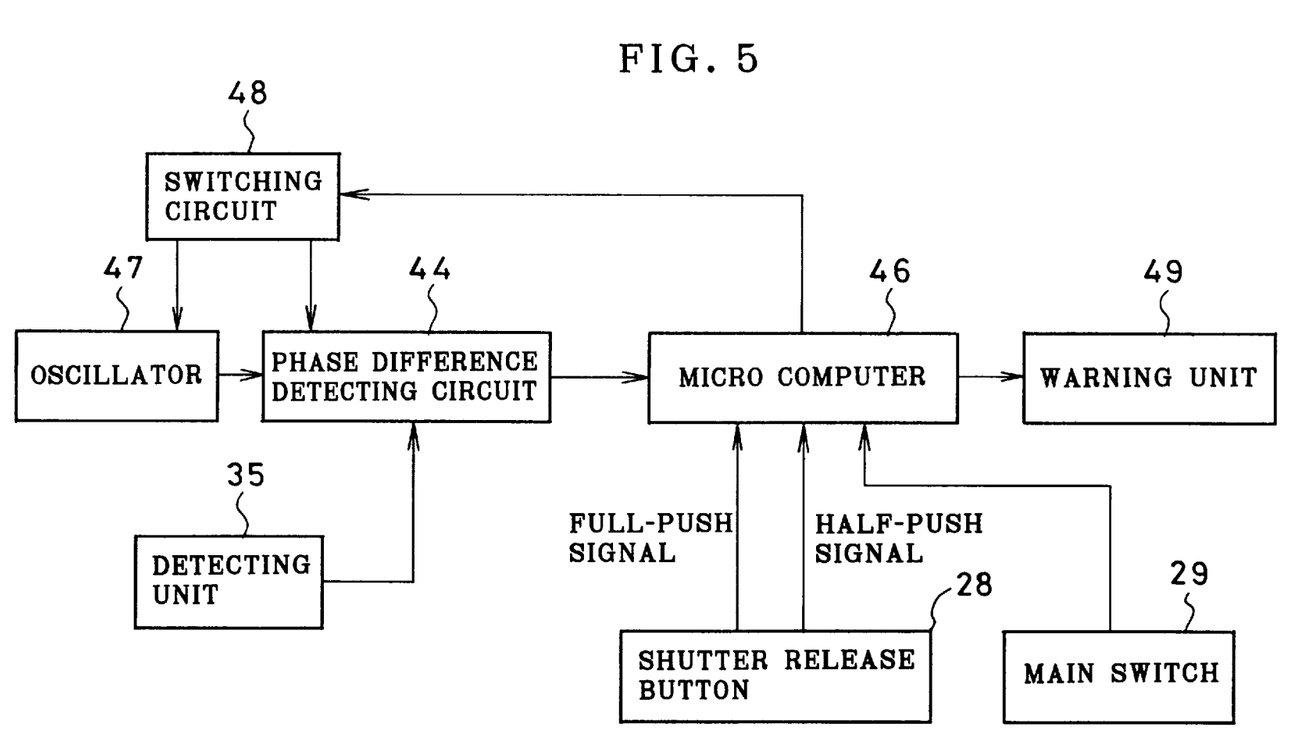
FIG. 5 is a block diagram showing an electric structure of the camera.

In FIG. 5 showing an electric structure of the camera 20, the phase difference detecting circuit 44 is connected with a micro computer 46, an oscillator 47 and a switching circuit 48 besides the foregoing detecting unit 35. The oscillator 47 generates a high-frequency pulse signal. The micro computer 46 is connected with the main switch 29, the shutter release button 28 and a warning unit 49. Further, the micro computer 46 is also connected with an automatic focusing mechanism, a shutter mechanism, an automatic flash device and so forth which are not shown.

When the micro computer 46 receives a half-push signal for focusing from the shutter release button 28, the micro computer 46 turns on the oscillator 47 and the detecting circuit 44 via the switching circuit 48. The oscillator 47 generates the high-frequency pulse signal of constant cycle and send it to the detecting circuit 44 during on-state.

The phase difference detecting circuit 44 detects a lag of phases of the high-frequency pulses outputted from the oscillator 47. The lag of phases is due to change of the capacitance C of the detecting unit 35. When the detecting circuit 44 detects the lag of phases, the detecting circuit 44 sends a low-level signal to the micro computer 46 as a detect signal. On the other hand, while the detecting circuit 44 does not detect the lag of phases, the detecting circuit 44 sends a high-level signal to the micro computer 46. The warning unit 49 is activated by the micro computer 46 when the low-level signal is inputted into the micro computer 46. And then, the warning unit 49 gives a warning to the photographer by lighting or blinking a light emitting diode installed in the finder 25.

Figure 6:
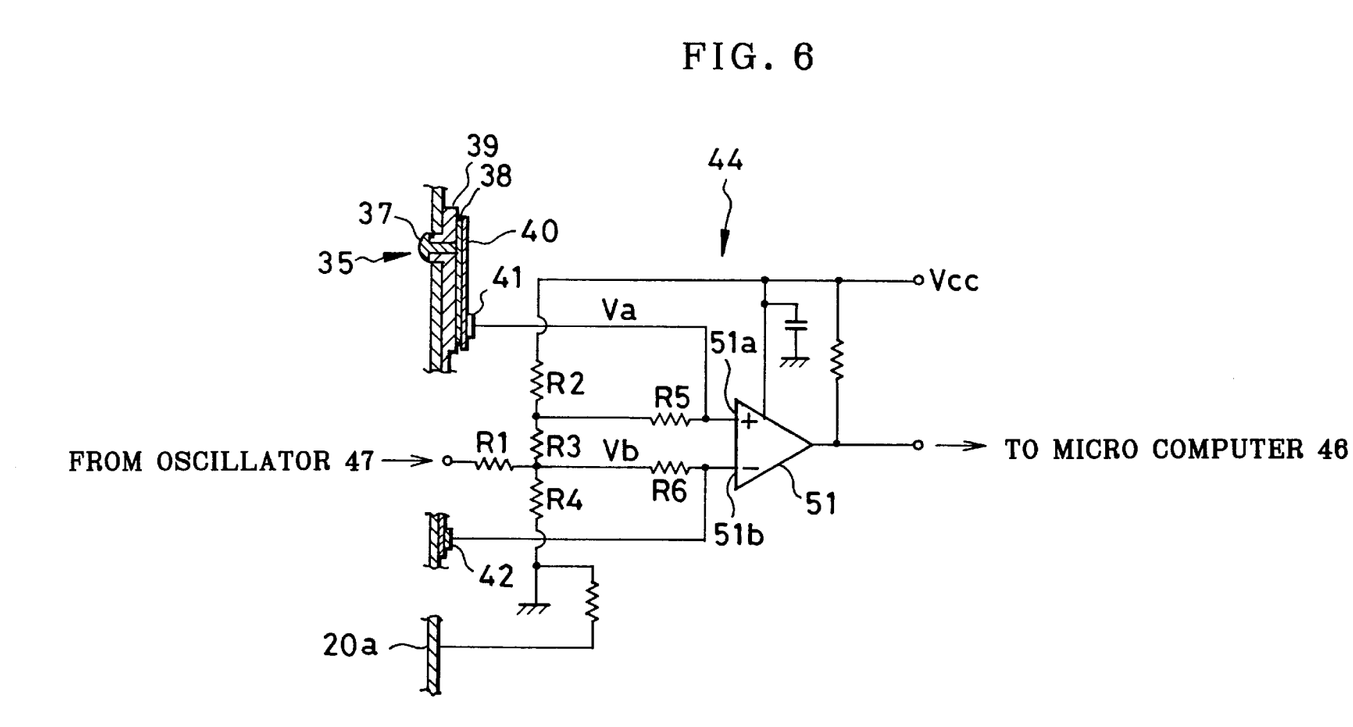
FIG. 6 is a circuit diagram of the phase difference detecting circuit.

As shown in FIG. 6 illustrating a circuit diagram of the phase difference detecting circuit 44, the high-frequency pulse signal outputted from the oscillator 47 is divided by resistances R1–R4 to generate two pulse signals which are a detected high-frequency pulse signal and a reference high-frequency pulse signal. The detected high-frequency pulse signal is inputted to a non-inverted input terminal 51a of a comparator 51 via a resistance R5. The reference high-frequency pulse signal is inputted to a inverted input terminal 51b via a resistance R6.

The non-inverted input terminal 51a is connected with the detecting electrode 41 so that a CR circuit is formed with the resistance R5 and the capacitance C of the detecting unit 35. The CR circuit is a delay circuit for the detected high-frequency pulse signal. On the other hand, the inverted input terminal 51b is connected with the correction electrode 42. The capacitance of the correction electrode 42 and the resistance R6 constitute a delay circuit for the reference high-frequency pulse signal. The correction electrode 42 and the resistance R6 prevent mis-detection when the photographer holds the camera 20 property without touching the detecting unit 35.

Figure 7A:
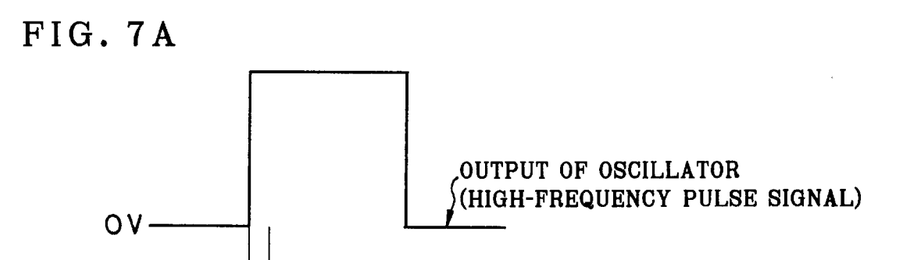
FIGS. 7A through 7D is a wave form chart of the phase difference detecting circuit.
Figure 7B:
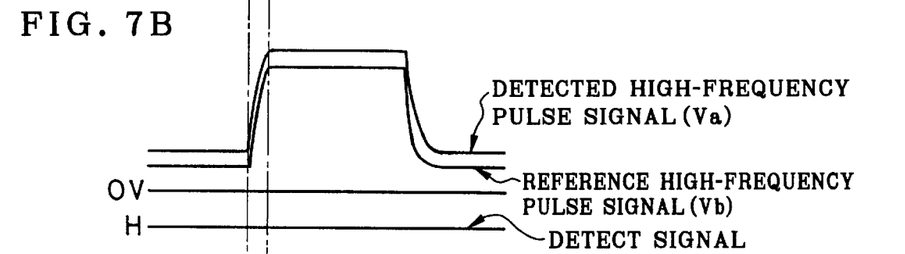

The high-frequency pulse signal outputted from the oscillator 47 is shown in FIG. 7A. As shown in FIG. 7B, the high-frequency pulse signal is changed by the phase difference detecting circuit 44 such that the detected high-frequency pulse signal goes in similar phase to that of the reference high-frequency pulse signal. Accordingly, voltage Va of the detected high-frequency pulse signal inputted to the non-inverted input terminal 51a is always kept in a state that the voltage Va is slightly higher than voltage Vb of the reference high-frequency pulse signal inputted to the inverted input terminal 51b. To sum up, the voltage Va is always higher than the voltage Vb.

Figure 7C:
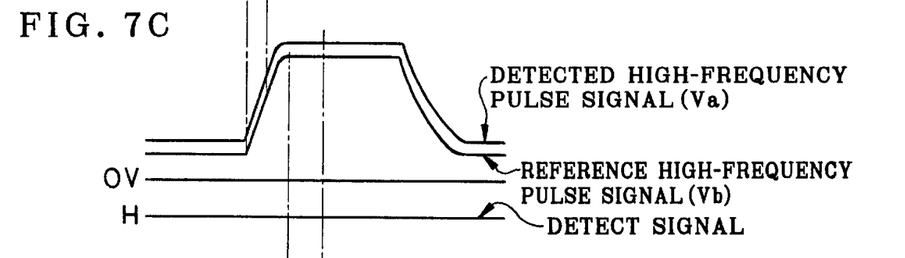
Figure 7D:
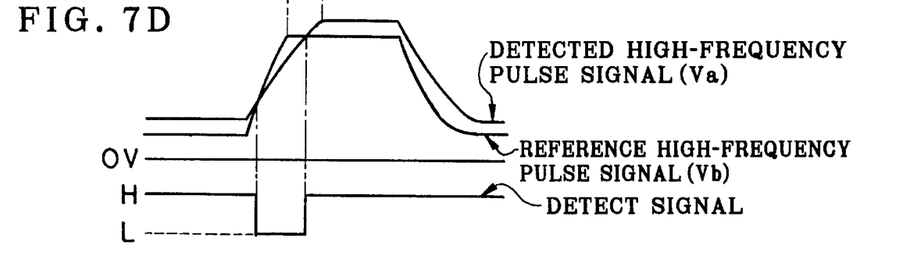

FIG. 7C shows a state that the hand of the photographer touches the camera 20. FIG. 7D shows a state that the photographer touches the detecting unit 35. When the photographer touches the detecting unit 35, delay of the phase of the detected high-frequency pulse signal increases. Thus, the voltage Vb becomes higher than the voltage Va in the course of rising of the pulse signal. The comparator 51 outputs the high-level signal while the voltage Va is higher than the voltage Vb (Va>Vb). To the contrary, while the voltage Va is lower than the voltage Vb (Va<Vb), the comparator 51 outputs the low-level signal.

Next, an operation of the above embodiment is described. When the photographer pushes the shutter release button 28 by half-stroke thereof, the high-frequency pulse signal having a sharp edge is outputted from the oscillator 47 as shown in FIG. 7A. The high-frequency pulse signal is inputted to the non-inverted input terminal 51a via the resistance R5 as the detected high-frequency pulse signal. Moreover, the high-frequency pulse signal is inputted to the inverted input terminal 51b via the resistance R6 as the reference high-frequency pulse signal.

For example, in a state that the camera 20 is held with a tripod or the like and the hand does not touch the external plate 20a, waveforms of the high-frequency pulse signals (change of the voltages Va and Vb) inputted into the terminals 51a and 51b have non-sharp rising edge as shown in FIG. 7B. Accordingly, the phase of each high-frequency pulse signal before reaching a peak voltage thereof is delayed relative to the output signal of the oscillator 47.

As to the detected high-frequency pulse signal, the delay circuit is constituted of the capacitance C1 of the detecting electrode 41 itself, the capacitance CD, the capacitance C2 of the conductive member 37 and the resistance R5 so that rising of the pulse is slowed. On the other hand, as to the reference high-frequency pulse signal, rising of the pulse is slowed by the delay circuit constituted of the capacitance of the correction electrode 42 itself and the resistance R6.

The phase of the reference high-frequency pulse signal before reaching the peak voltage thereof becomes similar to the phase of the detected high-frequency pulse signal before reaching the peak voltage thereof due to the delay circuit constituted of the correction electrode 42 and the resistance R6. Thus, the relationship between the voltage Va of the detected high-frequency pulse signal and the voltage Vb of the reference high-frequency pulse signal is kept in the state of Va>Vb. Accordingly, the high-level signal is inputted to the micro computer 46 from the comparator 51 so that the finger is not detected.

In the state that the photographer holds the camera 20 without overlapping the finger on the detecting unit, the capacitance Cm of the photographer is applied to the correction electrode 42 via the conductive external plate 20a and the second insulating member 39. Thus, as shown in FIG. 7C, the phase of the reference high-frequency pulse signal before reaching the peak voltage thereof is slightly slowed relative to the phase shown in FIG. 7B. In other words, rising of the reference high-frequency pulse signal shown in FIG. 7C is slower than that shown in FIG. 7B. However, the weakened capacitance Cm of the photographer is slightly applied to the detecting electrode 41 as well so that the rising of the detected high-frequency pulse signal is similarly slowed. Therefore, the relationship of the voltages Va and Vb, namely Va>Vb, is maintained. Accordingly, the finger is not detected.

When the finger of the photographer overlaps on the electronic flash 21, as the finger touches the conductive member 37, the capacitance Cm of the photographer is applied to the detecting electrode 41 via the auxiliary electrode 38 connected to the conductive member 37 and the first insulating member 40. Thus, as shown in FIG. 7D, the rising of the detected high-frequency pulse signal is further slowed. However, the capacitance Cm applied to the correction electrode 42 is weakened because the correction electrode 42 is disposed apart from the conductive detection member 37. Therefore, the phase of the reference high-frequency pulse signal is scarcely changed. Thus, while the pulse signals rise, the relationship between the voltages Va and Vb becomes Va<Vb so that the detect signal outputted from the comparator 51 is changed from high level to low level.

The micro computer 46 gives a warning to the photographer by lighting the light emitting diode in the finder 25 according to the low-level signal outputted from the phase difference detecting circuit 44. By the warning, the photographer is aware that the finger overlaps on the electronic flash 21. Therefore, holding of the camera 20 is corrected and the proper photographing may be performed.

In the above-described embodiments, the detecting unit is provided near the electronic flash. However, the detecting unit may be provided near the light emitting window and the light receiving window for measuring the distance, the photometry window, and the taking lens. Moreover, in the embodiment, the shape of the detecting unit bared to the outside is protruding shape and its number is one. However, the shape may be elongated ridge shape and a plurality of detecting units may be provided such as to surround the electronic flash. Further, mis-detection of the finger is prevented by means of the correction electrode, but instead of the correction electrode, a capacitor for correction may be connected to the inverted input terminal of the comparator constituting the phase difference detecting circuit. In this case, similar effect may be obtained. Further, when the external plate of the camera is made of plastic, the correction electrode may be omitted.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A camera having a finger detecting device for indirectly detecting that a finger contacts a window for emitting light or receiving light, said finger detecting device comprising:

a conductive member bared at a near portion of said window and to outside of said camera;

an auxiliary electrode connected to said conductive member and disposed in said camera;

a first insulating member attached to said auxiliary electrode;

a detecting electrode facing said auxiliary electrode via said first insulating member; and a detecting circuit connected with said detecting electrode, said detecting circuit detecting contact of said finger and said conductive member on the basis of a change of capacity.

2. A camera according to claim 1, wherein said auxiliary electrode is a plate and is larger than an area of a portion of said conductive member bared from said camera.

3. A camera according to claim 2, wherein said camera has a conductive external plate and said conductive member is insulated from said external plate by a second insulating member.

4. A camera according to claim 3, further comprising:

a correction electrode disposed inside of said external plate and at a separated position from said detecting electrode via said second insulating member, said correction electrode being connected to said detecting circuit, and said detecting circuit detecting said finger by detecting a relative change of capacities applied to said correction electrode and to said detecting electrode.

5. A camera according to claim 4, further comprising:

a warning unit activated in accordance with an output of said detecting circuit when said detecting circuit detects said finger.

6. A camera according to claim 5, wherein said warning unit gives a warning to a photographer by lighting or blinking a light emitting diode installed in a finder.

7. A camera according to claim 2, wherein said detecting circuit comprising:

an oscillator for generating a pulse;

a first CR circuit and a second CR circuit for delaying said pulse; and a comparator for comparing voltages of said pulse passing through said first CR circuit and said pulse passing through said second CR circuit to detect said capacity of said detecting electrode.

8. A camera according to claim 7, wherein said first CR circuit is constituted of a first resistance and said capacity of said detecting electrode, and said second CR circuit is constituted of a second resistance and said capacity of said correction electrode.

9. A camera having a finger detecting device for indirectly detecting that a finger contacts a window for emitting light or receiving light, said finger detecting device comprising:

a conductive member bared at a near portion of said window and to outside of said camera;

an auxiliary electrode integrally provided with said conductive member and disposed in said camera;

a detecting electrode facing said auxiliary electrode; and a detecting circuit for detecting whether said finger contacts said conductive member on the basis of a change of capacity of said detecting electrode.

* * * * *